Oct. 7, 1958   C. R. O'DONNELL   2,854,690
AUTOMATIC POULTRY NECK BREAKING, NECK SKIN
STRETCHER, AND HEAD REMOVING MACHINE
Original Filed Aug. 31, 1955   2 Sheets-Sheet 1
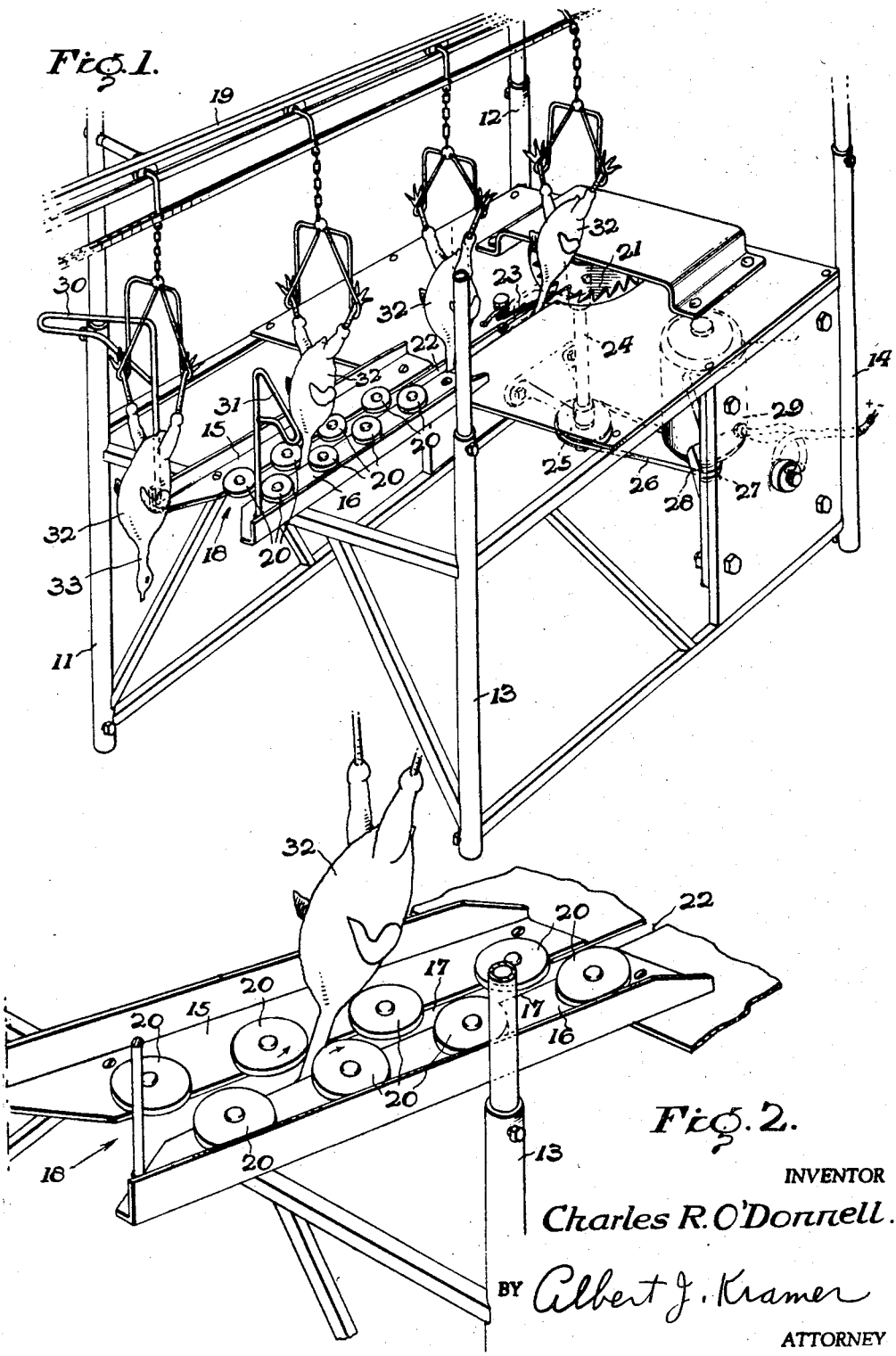
INVENTOR
Charles R. O'Donnell.
BY Albert J. Kramer
ATTORNEY Oct. 7, 1958  C. R. O'DONNELL  2,854,690
AUTOMATIC POULTRY NECK BREAKING, NECK SKIN
STRETCHER, AND HEAD REMOVING MACHINE
Original Filed Aug. 31, 1955  2 Sheets-Sheet 2
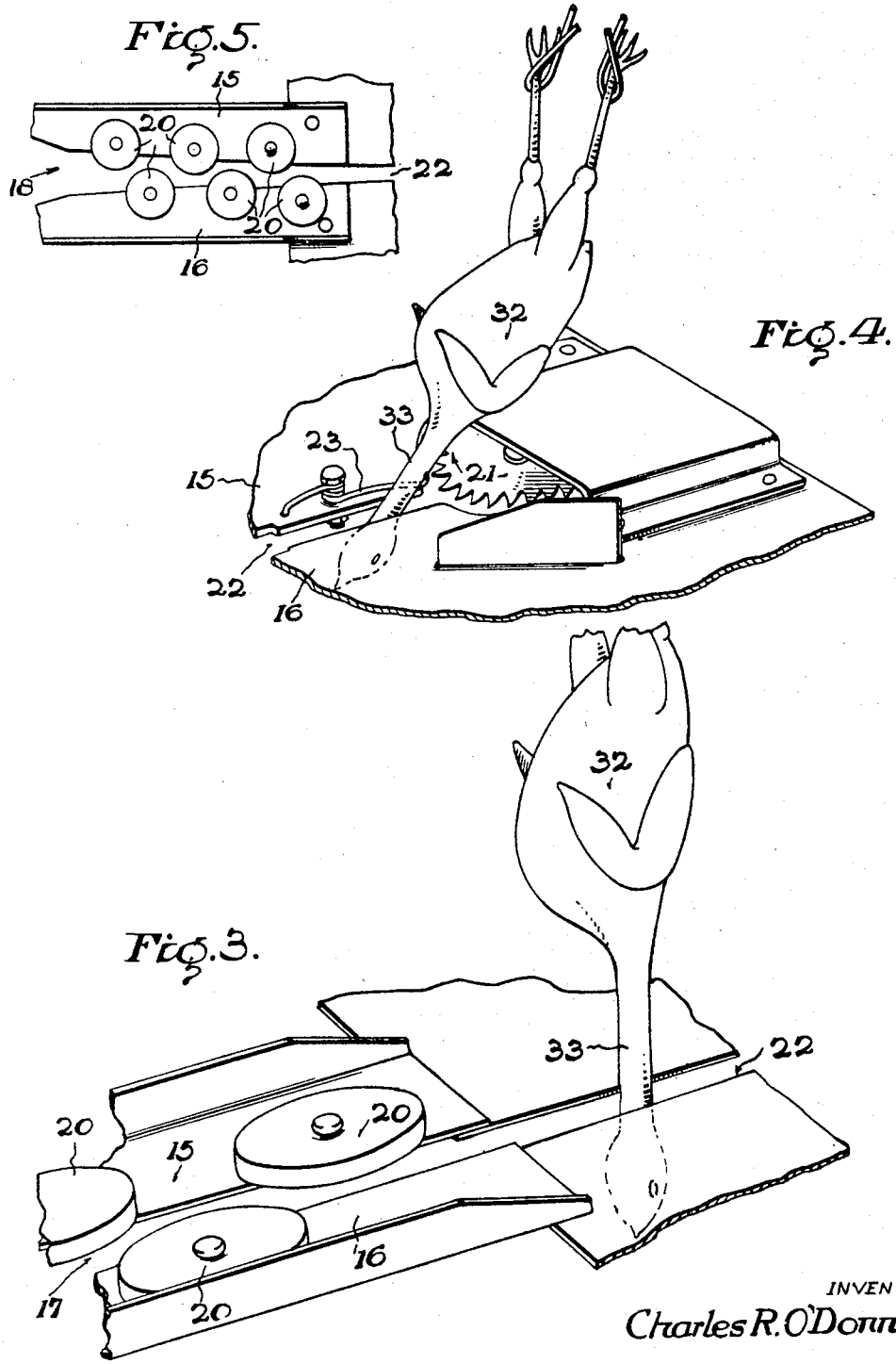
INVENTOR
Charles R. O'Donnell.
BY Albert J. Kramer
ATTORNEY

United States Patent Office 2,854,690
Patented Oct. 7, 1958

2,854,690

AUTOMATIC POULTRY NECK BREAKING, NECK SKIN STRETCHER, AND HEAD REMOVING MACHINE

Charles R. O'Donnell, Luray, Va.

Original application August 31, 1955, Serial No. 531,706. Divided and this application August 6, 1957, Serial No. 676,535

1 Claim. (Cl. 17—45)

This is a division of my copending application Serial No. 531,706, filed August 31, 1955.

This invention relates to poultry processing machines and equipment, and is more particularly concerned with machines or apparatus for operating on the neck and head portions of poultry.

In the poultry industry, after fowl are killed, scalded and cleaned, they are processed for the purpose of removing the head. Heretofore this has been conventionally done by first breaking the neck bone and then cutting through the skin at the point where the bone had been broken. The breaking of the neck bone is customarily done by hand and because of this a breaking of this bone close to the head was not possible or feasible. This meant that an edible portion of the neck bone and neck skin was carried away with the head which is either discarded or sold for inedible scrap at a price much lower than the edible parts of the fowl remaining on the carcass. This represents not only a waste of food to the economy of the country, particularly in view of the very large scale operations which have developed in this country during recent years, but also a loss of profit to the processor.

One of the objects of this invention is the provision of a machine or apparatus which is effective to break the neck bone of fowl or poultry at the base of the skull, to stretch the skin lengthwise about the neck bone and then to sever the head from the skin in such a manner as to salvage edible portions of the poultry which were heretofore discarded with the head. It is to be understood that the term "poultry" and "fowl" as used herein includes chickens, turkeys, ducks, pheasants, guineas and all other forms of fowl used as food for human consumption.

Another object of the invention is the provision of such a machine or apparatus which is automatic in its operation or use.

A further object of the invention is the provision of a method for removing the heads of poultry with a minimum of waste of edible parts of the poultry.

A still further object of the invention is the provision of such a machine or apparatus which is inexpensive to manufacture, sturdy in construction, is long wearing, and is not liable to get out of order easily.

Other objects and advantages of the invention will be apparent from the following description considered together with the accompanying drawing.

In the drawing:

Fig. 1 is a perspective view of an embodiment of the invention, partially broken away, showing a line of poultry being passed therethrough in different relative positions.

Fig. 2 is a perspective view of a fragmentary portion of the embodiment on a larger scale with the neck of a fowl in the initial neckbone breaking and skin stretching stage of the device.

Fig. 3 is a perspective view of a different fragmentary portion showing the neck of the fowl in an intermediate position just prior to severing of the head.

Fig. 4 is a perspective view of still another fragmentary portion of the embodiment showing the fowl in the position where its head is about to be severed from the neck.

Fig. 5 is a top plan view of a portion of the passageway of the device.

Referring with more particularity to the drawing in which like reference characters designate like parts, the embodiment illustrated comprises a frame structure including supporting corner posts 11, 12, 13 and 14. The frame structure also comprises horizontal plate members 15 and 16 which are disposed relative to each other so as to form a longitudinal passageway 17 in the general shape of a narrowing slot or elongated V, extending from the front end or throat 18 toward the rear end. The device is positioned beneath an overhead conveyor 19 with the longitudinal axis of the passageway parallel to the overhead conveyor.

The plate members 15 and 16 are provided with a plurality of staggered discs 20 which project over into the passageway, substantially as shown, thereby forming a tortuous, progressively constricting passageway for the necks of fowl.

At the end of the passageway 17, there is horizontally disposed a circular rotating knife 21. A portion 22 of the passageway 17, in advance of the circular knife, is free of any obstruction to permit the head to drop down after the neck bone has been broken. This portion, however, contains a resilient drag or resistance or restricting member in the form of a spring wire 23, immediately in front of the knife 21, which contacts the neck of the fowl as it passes through the portion 22 and holds it until the fowl assumes an angle as a result of the unrestrained movement of its upper part, so that the base of the skull is presented to the leading edge of the knife, whereupon continued movement of the upper part of the carcass overcomes the resistance interposed by the spring wire 23 and direct contact is made at the juncture of the head and neck of the fowl against the knife.

The rotary knife 21 is mounted on the upper end of a shaft 24 having a pulley 25 connected by a belt 26 to the sheave on the take-off shaft 28 of an electric motor 29, mounted on the frame of the device.

Guide bars 30 and 31 are also mounted at the entrance or throat 18 of the passageway 17 to guide the fowl into proper position.

In actual operation, poultry 32 are fed to the device after the usual scalding and defeathering operations. The conveyor 19 shown in the drawing represents a continuation of the conventional poultry conveyors from the defeathering machines.

The necks 33 of the poultry enter the throat 18 of the passageway and as they are forced through the passageway by the forced movement of the upper part on the conveyor there comes a point in the narrowing slot, depending upon the size of the neck, where the head is caught underneath the discs 20 and the neck cannot move further between the discs, whereupon continued movement of the upper part of the carcass causes the first vertebra of the neck bone to be broken away from the base of the skull. When this happens, continued movement causes the neck to stretch and the portion of the neck adjacent the discs 20 collapses sufficiently to permit the neck to resume movement through the passageway until the portion 22 is reached, whereupon the fowl again assumes a vertical position, as illustrated in Fig. 1, due to the release of all horizontal restraint on the neck.

As the carcass moves through this final portion 22, the neck comes in contact with the resilient resistance member 23 which functions in the manner explained above to cause the skin at the base of the skull to be presented to the knife 21 for severing.

Having thus described my invention, I claim:

In the processing of poultry, the method of removing the head of the poultry from the carcass, comprising breaking the neck bone of the fowl to sever the same at its point of connection to the head, stretching the neck skin longitudinally to retract the severed end of the neck bone therewith, and then severing the stretched skin at a point adjacent the head.

References Cited in the file of this patent

UNITED STATES PATENTS 2,632,200    Fortner et al. _____ Mar. 24, 1953